US 11,728,666 B2

(12) United States Patent
Sakamoto

(10) Patent No.: US 11,728,666 B2
(45) Date of Patent: Aug. 15, 2023

(54) POWER SUPPLY SYSTEM

(71) Applicant: HONDA MOTOR CO., LTD., Tokyo (JP)

(72) Inventor: Hiroki Sakamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/678,029

(22) Filed: Feb. 23, 2022

(65) Prior Publication Data

US 2022/0302731 A1 Sep. 22, 2022

(30) Foreign Application Priority Data

Mar. 19, 2021 (JP) .................................. 2021-046139

(51) Int. Cl.
| | |
|---|---|
| *H02J 7/00* | (2006.01) |
| *B60L 50/60* | (2019.01) |
| *B60L 58/18* | (2019.01) |
| *B60L 58/26* | (2019.01) |
| *H02J 7/34* | (2006.01) |

(52) U.S. Cl.
CPC .......... *H02J 7/00712* (2020.01); *B60L 50/60* (2019.02); *B60L 58/18* (2019.02); *B60L 58/26* (2019.02); *H02J 7/342* (2020.01); *H02J 2207/20* (2020.01)

(58) Field of Classification Search
CPC .... H02J 7/00712; H02J 7/342; H02J 2207/20; B60L 58/18; B60L 50/60; B60L 58/26

USPC .......................................................... 307/20
See application file for complete search history.

(56) References Cited

U.S. PATENT DOCUMENTS

2009/0289497 A1 11/2009 Ichikawa et al.
2019/0299807 A1* 10/2019 Oyama .................. B60K 23/08

FOREIGN PATENT DOCUMENTS

JP 4379441 B2 12/2009

* cited by examiner

*Primary Examiner* — Daniel Kessie
*Assistant Examiner* — Dru M Parries
(74) *Attorney, Agent, or Firm* — CKC & Partners Co., LLC

(57) ABSTRACT

A power supply system includes: a capacitive first battery; an output-type second battery having a smaller heat capacity than the first battery; a voltage converter that converts a voltage between first and second power circuits; a power converter that converts power between the first power circuit and a drive motor; and a power controller that operates the voltage converter and the power converter. The power controller is configured to: after a start of operation, execute a power pass control under which power is transferred between the first and second batteries, until a total output upper limit Ptot_max of all the batteries exceeds a travelable threshold value Pready1; and subsequent to the power pass control, execute a second priority control under which the second battery is discharged in preference to the first battery, until a first output upper limit P1_max of the first battery exceeds a margin traveling threshold value Pready2.

2 Claims, 6 Drawing Sheets

POWER SUPPLY SYSTEM

This application is based on and claims the benefit of priority from Japanese Patent Application No. 2021-046139, filed on 19 Mar. 2021, the content of which is incorporated herein by reference.

BACKGROUND OF THE INVENTION

Field of the Invention

The present invention relates to a power supply system. More specifically, the present invention relates to a power supply system including two electrical storage devices.

Related Art

In recent years, electric vehicles, such as electric transport equipment equipped with a drive motor as a motive power generation source and hybrid vehicles equipped with a drive motor and an internal combustion engine as motive power generation sources, have been developed actively. Such an electric vehicle is also equipped with a power supply device such as an electrical storage device (for example, a battery or a capacitor) or a fuel cell for supplying electrical energy to the drive motor. Recently, electric vehicles equipped with a plurality of electrical accumulators with different characteristics have also been developed.

Japanese Patent. No. 4379441 discloses an invention relating to an electric vehicle that travels by power outputted from a first electrical storage device and a second electrical storage device. When a temperature of an electrical storage device such as a secondary battery or a capacitor drops, power output performance thereof decreases. For this reason, when the electric vehicle starts up in a low temperature environment (so-called cold start), it is necessary to raise temperatures of the electrical storage devices until power output performance required for these electrical storage devices to move the electric vehicle is ensured. In the electric vehicle disclosed in Japanese Patent No. 4379441, the power is transferred between the first electrical storage device and the second electrical storage device at the time of cold start, and the temperatures of the first and second electrical storage devices are raised by heat generated by charging and discharging.

Patent Document 1: Japanese Patent No. 4379441

SUMMARY OF THE INVENTION

In the electric vehicle disclosed in Japanese Patent No. 4379441, since the power is transferred between the first and second electrical storage devices as described above until the desired traveling performance (for example, traveling performance to the extent that margin traveling to be described later is possible) is ensued by these electrical storage devices at the time of cold start, it may take time until the vehicle can travel.

An object of the present invention is to provide a power supply system capable of rapidly securing power output performance of electrical storage devices at the time of cold start.

(1) A power supply system (for example, a power supply system 1 described later) according to an embodiment of the present invention includes: a first power circuit (for example, a first power circuit 2 described later) including a first electrical storage device (for example, a first battery B1 described later); a second power circuit (for example, a second power circuit 3 described later) including a second electrical storage device (for example, a second battery B2 described later) having a smaller heat capacity than the first electrical storage device; a voltage converter (for example, a voltage converter 5 described later) that converts a voltage between the first power circuit and the second power circuit; a power converter (for example, a power converter 43 described later) that converts power between the first power circuit and a rotary electrical machine (for example, a drive motor M described later); and a power controller (for example, a management ECU 71, a motor ECU 72, and a converter ECU 73 described later) that controls charging and discharging of the first and second electrical storage devices by operating the voltage converter and the power converter. The power controller is configured to: after a start of operation, execute a power pass control under which power is transferred between the first electrical storage device and the second electrical storage device, until a first condition regarding power output performance (for example, a first output upper limit P1_max, a second output upper limit P2_max, and a total output upper limit Ptot_max described later) of both or either of the first electrical storage device and the second electrical storage device is satisfied; and subsequent to the power pass control, execute a second priority control under which the second electrical storage device is discharged in preference to the first electrical storage device, until a second condition regarding power output performance of both or either of the first electrical storage device and the second electrical storage device is satisfied.

(2) In this case, preferably, the second electrical storage device has a higher-output weight density and a lower energy-weight density than the first electrical storage device.

(3) A power supply system (for example, a power supply system 1 described later) according to an embodiment of the present invention includes: a first power circuit (for example, a first power circuit 2 described later) including a first electrical storage device (for example, a first battery B1 described later); a second power circuit (for example, a second power circuit 3 described later) including a second electrical storage device (for example, a second battery B2 described later) having a higher output weight density and a lower energy weight density than the first electrical storage device; a voltage converter (for example, a voltage converter 5 described later) that converts a voltage between the first power circuit and the second power circuit; a power converter (for example, a power converter 43 described later) that converts power between the first power circuit and a rotary electrical machine (for example, a drive motor M described later); and a power controller (for example, a management ECU 71, a motor ECU 72, and a converter ECU 73 described later) that controls charging and discharging of the first and second electrical storage devices by operating the voltage converter and the power converter. The power controller is configured to: after a start of operation, execute a power pass control under which power is transferred between the first electrical storage device and the second electrical storage device, until a first condition regarding power output performance (for example, a first output upper limit P1_max, a second output upper limit P2_max, and a total output upper limit Ptot_max described later) of both or either of the first electrical storage device and the second electrical storage device is satisfied; and subsequent to the power pass control, execute a second priority control under which the second electrical storage device is discharged in preference to the first electrical storage device, until a second condition regarding power output performance (for example, a first output upper limit P1_max, a second output upper limit P2_max, and a total output upper limit Ptot_max described later) of both or either of the first electrical storage device and the second electrical storage device is satisfied.

(4) In this case, preferably, the second electrical storage device has a smaller heat capacity than the first electrical storage device.

(5) In this case, preferably, the power supply system further includes a requested output acquirer (for example, a management ECU 71, and a pedal P described later) that acquires a requested output in the rotary electrical machine, and the power controller operates the voltage converter and the power converter under the second priority control such that the first electrical storage device outputs power corresponding to a shortage obtained by subtracting a second output upper limit from the requested output, the second output upper limit being an upper limit of power capable of being outputted from the second electrical storage device.

(6) In this case, preferably, the second condition is that a first output upper limit exceeds a second condition threshold value, the first output upper limit being an upper limit of power capable of being outputted from the first electrical storage device, and the power controller executes a normal control under which the first electrical storage device is discharged in preference to the second electrical storage device.

(7) In this case, preferably, the power controller charges the second electrical storage device with the power outputted from the first electrical storage device under the normal control.

(8) In this case, preferably, the power supply system further includes: a first cooler (for example, a first cooler 91 described later) that cools the first electrical storage device; and a first cooling output controller (for example, a management ECU 71 and a cooling circuit ECU 76 described later) that controls a first cooling output of the first cooler, and the first cooling output controller makes the first cooling output smaller until the second condition is satisfied, as compared with after the second condition is satisfied.

(9) In this case, preferably, the power supply system further includes: a second cooler (for example, a second cooler 92 described later) that cools the second electrical storage device; and a second cooling output controller (for example, a management ECU 71 and a cooling circuit ECU 76 described later) that controls a second cooling output of the second cooler, and the second cooling output controller makes the second cooling output smaller until the first condition is satisfied, as compared with after the first condition is satisfied.

(1) In the present invention, after start of operating the power supply system, the power controller executes the power pass control, under which the power is transferred between the first electrical storage device and the second electrical storage device, until the first condition regarding the power output performance of both or either of the first electrical storage device and the second electrical storage device is satisfied, and raises the temperatures of the first and second electrical storage devices. Thereafter, the power controller executes the second priority control, under which the second electrical storage device is discharged in preference to the first electrical storage device, until the second condition regarding the power output performance is satisfied. In the present invention, the second battery having the smaller heat capacity than the first battery is used. Therefore, according to the present invention, since the temperature of the second electrical storage device can be raised more quickly than that of the first electrical storage device by execution of the power pass control and the second priority control at the time of cold start, the required power output performance can be quickly ensured mainly by the second electrical storage device.

(2) In the present invention, an output-type battery having a higher output-weight density and a lower energy-weight density than the first electrical storage device is used as the second electrical storage device, whereby the second electrical storage device can be heated more quickly at the time of execution of the power pass control and the second priority control, so that the required power output performance can be further quickly ensured mainly by the second electrical storage device.

(3) In the present invention, an output-type battery having a higher output-weight density and a lower energy-weight density than the first electrical storage device is used as the second electrical storage device. Therefore, according to the present invention, since the output-type second electrical storage device can be heated more quickly than the capacitive first electrical storage device by execution of the power pass control and the second priority control at the time of cold start, the required power output performance can be quickly ensured mainly by the second electrical storage device.

(4) In the present invention, the second electrical storage device having the smaller heat capacity than the first electrical storage device is used, whereby the second electrical storage device can be heated more quickly at the time of execution of the power pass control and the second priority control, so that the required power output performance can be quickly ensured mainly by the second electrical storage device.

(5) In the present invention, the power controller operates the voltage converter and the power converter under the second priority control such that the first electrical storage device outputs power corresponding to the shortage obtained by subtracting the second output upper limit, which is the upper limit of power capable of being outputted from the second electrical storage device, from the requested output in the rotary electrical machine. Due to this feature, after the first condition is satisfied, while the rotary electrical machine is driven by the power supplied from the first power circuit to the rotary electrical machine according to the requested output, the second electrical storage device can be caused to actively discharge, so that the temperature of the second electrical storage device can be raised quickly.

(6) In the present invention, the power controller executes the normal control, under which the second electrical storage device (or the output-type second electrical storage device) having the smaller heat capacity than the first electrical storage device is preferentially caused to discharge, after executing the second priority control until the first output upper limit of the first electrical storage device exceeds the second condition threshold value. Due to this feature, after the second condition is satisfied, the temperature of the first electrical storage device can be further raised, so that the power output performance of the first electrical storage device can be further improved.

(7) In the present invention, the power controller charges the second electrical storage device with the power outputted from the first electrical storage device under the normal control after the second condition is satisfied. Due to this feature, it is possible to promote the temperature rise of the first electrical storage device while ensuring a sufficient battery level of the second electrical storage device whose power output performance has become sufficiently high through the power pass control and the second priority control, and to further improve the power output performance of the first electrical storage device.

(8) In the present invention, the first cooling output controller makes the first cooling output of the first cooler smaller until the second condition is satisfied, that is, while the temperature of the second electrical storage device is mainly raised by the power pass control and the second priority control, as compared with after the second condition is satisfied. This feature makes it possible to shorten the time until the second condition is satisfied.

(9) In the present invention, the second cooling output controller makes the second cooling output of the second cooler, which cools the second electrical storage device, smaller until the first condition is satisfied, that is, while the temperature of the second electrical storage device is raised by the power pass control, as compared with after the first condition is satisfied, that is, while the temperature of the second electrical storage device is raised by execution of the second priority control. This feature makes it possible to shorten the time until the first condition is satisfied, that is, the time until the power can be supplied to the rotary electrical machine.

DETAILED DESCRIPTION OF THE INVENTION

Figure 1:
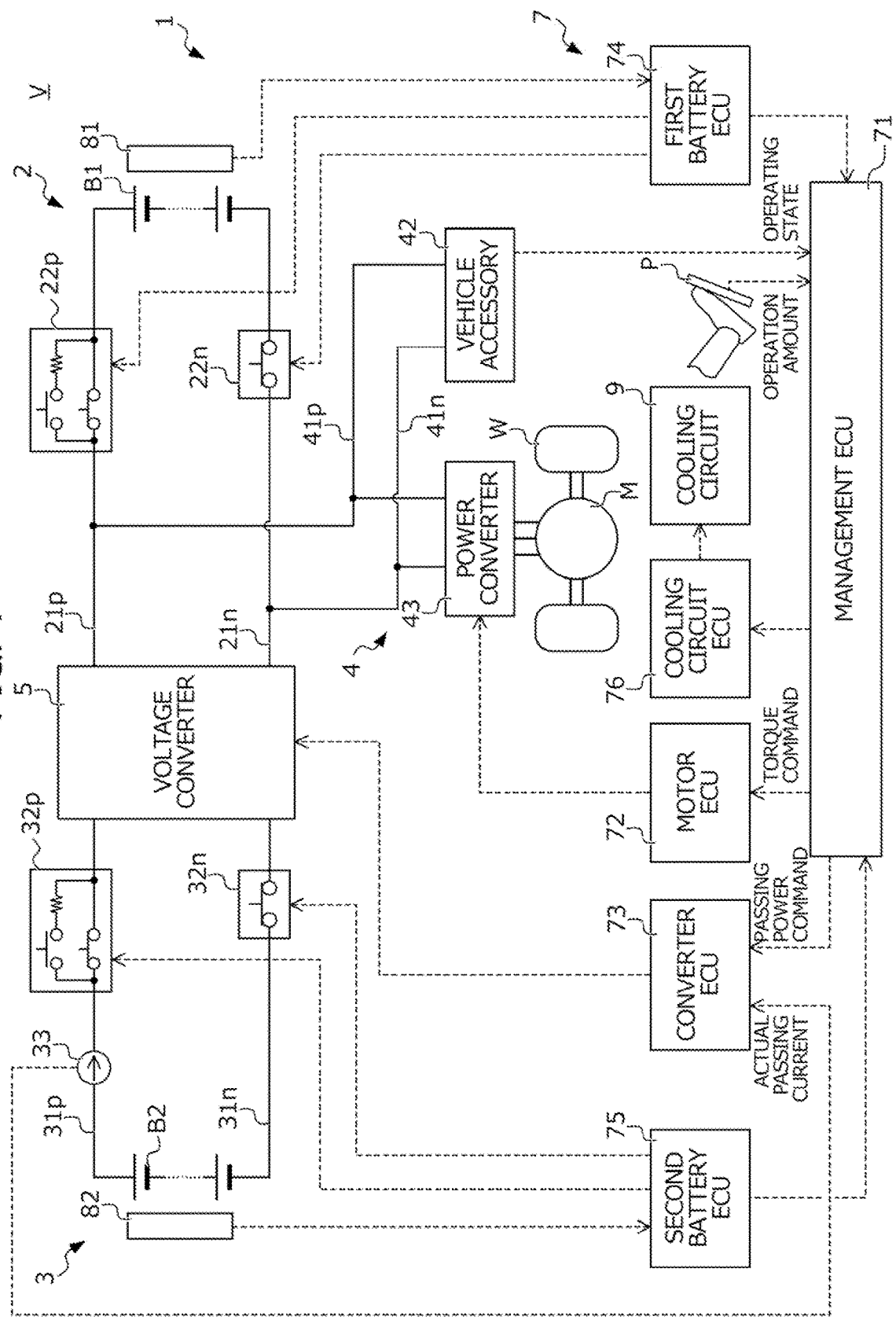
FIG. 1 is a diagram showing the configuration of a vehicle equipped with a power supply system according to an embodiment of the present invention.

An embodiment of the present invention will be described with reference to the drawings. FIG. 1 is a diagram showing the configuration of a four-wheeled electric vehicle V (hereinafter simply referred as "vehicle") mounted with a power supply system 1 according to the present embodiment. In the present embodiment, a case will be described where the power supply system 1 is mounted on the four-wheeled vehicle V, but the present invention is not limited thereto. The power supply system according to the present invention may be applied to not only the four-wheeled vehicle V, but also mobile bodies such as a saddled vehicle, a ship, a robot, and an unmanned aircraft which move by a propulsive force generated by a rotary electrical machine, and a stationary power source.

The vehicle V includes drive wheels W, a drive motor M as a rotary electrical machine coupled to the drive wheels W; and the power supply system 1 which transfers power between the drive motor M and a first battery B1 and a second battery B2 described later. It should be noted that the present embodiment will be described based on an example in which the vehicle V accelerates and decelerates with the motive power generated mainly by the drive motor M; however, the present invention is not to be limited thereto. The vehicle V may be configured as a so-called hybrid vehicle equipped with the drive motor M and an engine as the motive power generation source.

The drive motor M is coupled to the drive wheels W via a power transmission mechanism (not shown). The drive motor M generates torque by receiving three-phase alternating current power supplied from the power supply system 1. The generated torque is transmitted to the drive wheels W via the power transmission mechanism (not shown) to cause the drive wheel W to rotate and the vehicle V to move. In addition, the drive motor M performs a function of a generator during deceleration of the vehicle V, generates regenerative electric power, and provides the drive wheels W with regenerative braking torque corresponding to the magnitude of the regenerative electric power. The regenerative electric power generated by the drive motor M is charged to the batteries B1, B2 of the power supply system 1 as appropriate.

The power supply system 1 includes a first power circuit 2 to which the first battery B1 is connected, a second power circuit 3 to which the second battery B2 is connected, a voltage converter 5 which connects the first power circuit 2 to the second power circuit 3, a load circuit 4 including various electrical loads including the drive motor M, a cooling circuit 9 for cooling the first battery B1 and the second battery B2, and an electronic control unit group 7 which controls, for example, flow of power in the power circuits 2, 3, and 4, charging/discharging of the batteries B1 and B2, and cooling output of the cooling circuit 9 by operating the power circuits 2, 3, and 4, the cooling circuit 9, and the voltage converter 5. The electronic control unit group 7 includes a management ECU 71, a motor ECU 72, a converter ECU 73, a first battery ECU 74, a second battery ECU 75, and a cooling circuit ECU 76 which are each a computer.

The first battery B1 is a secondary battery capable of both discharging which converts chemical energy into electrical energy, and charging which converts the electrical energy into chemical energy. In the following, a case is described in which a so-called lithium-ion storage battery which performs charging/discharging by means of lithium ions moving between electrodes is employed as the first battery B1; however, the present invention is not limited thereto.

The first battery B1 is provided with a first battery sensor unit 81 for estimating an internal state of the first battery B1. The first battery sensor unit 81 includes a plurality of sensors that detect physical quantities required for the first battery ECU 74 to acquire a charge rate of the first battery B1 (an amount of electricity stored in the battery expressed as a percentage) corresponding to a battery level of the first battery B1 and a temperature of the first battery B1. The plurality of sensors transmit signals corresponding to the detection values to the first battery ECU 74. More specifically, the first battery sensor unit 81 includes, for example, a voltage sensor that detects a terminal voltage of the first battery B1, a current sensor that detects an electrical current flowing in the first battery B1, and a temperature sensor that detects the temperature of the first battery B1.

The second battery B2 is a secondary battery capable of both discharging that converts chemical energy into electrical energy, and charging that converts electrical energy into chemical energy. In the following, a case is described in which a so-called lithium-ion battery which performs charging/discharging by way of lithium ions moving between electrodes is employed as the second battery B2; however, the present invention is not limited thereto. The second battery B2 may be configured as, for example, a capacitor.

The second battery B2 is provided with a second battery sensor unit 82 for estimating an internal state of the second battery B2. The second battery sensor unit 82 includes a plurality of sensors that detect physical quantities required for the second battery ECU 75 to acquire a charge rate, a temperature, etc. of the second battery B2. The plurality of sensors transmit signals corresponding to the detection values to the second battery ECU 75. More specifically, the second battery sensor unit 82 include, for example, a voltage sensor that detects a terminal voltage of the second battery B2, a current sensor that detects an electrical current flowing in the second battery B2, and a temperature sensor that detects a temperature of the second battery B2.

Here, the characteristics of the first battery B1 are compared with the characteristics of the second battery B2. The first battery B1 has a lower output-weight density and a higher energy-weight density than the second battery B2. In addition, the first battery B1 has a larger discharge capacity than the second battery B2. In other words, the first battery B1 is superior to the second battery B2 in terms of energy weight density. The energy-weight density refers to an amount of electric power per unit weight (Wh/kg), and the output-weight density refers to electric power per unit weight (W/kg). Therefore, the first battery B1 that excels in the energy-weight density is a capacitance-type accumulator with high capacity as its main purpose, whereas the second battery B2 that excels in output-weight density is an output-type accumulator with high output as its main purpose. For this reason, the power supply system 1 uses the first battery B1 as the main power source, and uses the second battery B2 as an auxiliary power source which supplements the first battery B1. Further, the second battery B2 has a smaller heat capacity than the first battery B1. Therefore, the temperature of the second battery B2 rises more rapidly than that of the first battery B1.

The first power circuit 2 includes: the first battery B1, first power lines 21p and 21n which connect a positive electrode and a negative electrode of the first battery B1 to a positive terminal and a negative terminal of a high-voltage side of the voltage converter 5, and a positive contactor 22p and a negative contactor 22n provided to the first power lines 21p, 21n.

The contactors 22p, 22n are of a normal open type which open in a state in which a command signal from outside is not being inputted and electrically disconnect both electrodes of the first battery B1 from the first power lines 21p, 21n, and which close in a state in which a command signal is being inputted and connects the first battery B1 to the first power lines 21p, 21n. The contactors 22p, 22n open/close in response to a command signal transmitted from the first battery ECU 74. The positive contactor 22p is a pre-charge contactor having a pre-charge resistance for reducing an inrush current to a plurality of smoothing capacitors provided to the first power circuit 2, the load circuit 4, etc.

The second power circuit 3 includes: the second battery B2, second power lines 31p, 31n which connect a positive electrode and a negative electrode of the second battery B2 to a positive terminal and a negative terminal of a low-voltage side of the voltage converter 5, a positive contactor 32p and a negative contactor 32n provided to the second power lines 31p, 31n, and a current sensor 33 provided to the second power line 31p.

The contactors 32p, 32n are of a normal-open type which open in a state in which a command signal from outside is not being inputted and electrically disconnect both electrodes of the second battery B2 from the second power lines 31p, 31n, and which close in a state in which a command signal is being inputted and connect between the second battery B2 and the second power lines 31p, 31n. The contactors 32p, 32n open/close in response to a command signal transmitted from the second battery ECU 75.
the positive contactor 32p is a pre-charge contactor having a pre-charge resistance for reducing an inrush current to a plurality of smoothing capacitors provided to the first power circuit 2, the load circuit 4, etc.

The electric current sensor 33 transmits, to the converter ECU 73, a detection signal according to a value of a passing current, which is the electrical current flowing through the second power line 31p, i.e., the electrical current flowing through the voltage converter 5. It should be noted that, in the present embodiment, a direction of the passing current from the second power circuit 3 to the first power circuit 2 is defined as a positive, and a direction of the passing current from the first power circuit 2 to the second power circuit 3 is defined as a negative. In other words, the passing current that passes through the voltage converter 5 becomes positive when the second battery B2 discharges, and becomes negative when the second battery B2 is charged.

The load circuit 4 includes: a vehicle accessory 42, the power converter 43 to which the drive motor M is connected, and load power lines 41p, 41n which connect the vehicle accessory 42 and power converter 43 to the first power circuit 2.

The vehicle accessory 42 is constituted by a plurality of electrical loads, such as a battery heater, an air compressor, a DC-DC converter, and an onboard charger. The vehicle accessory 42 is connected to the first power lines 21p, 21n of the first power circuit 2 via the load power lines 41p, 41n, and operates by consuming the electric power of the first power lines 21p, 21n. The information regarding operating states of the various electrical loads constituting the vehicle accessory 42 is transmitted to, for example, the management ECU 71.

The power converter 43 is connected, via the load power lines 41p, 41n, to the first power lines 21p, 21n parallel with the vehicle accessory 42. The power converter 43 converts the electric power between the first power lines 21p, 21n and the drive motor M. The power converter 43 is, for example, a PWM inverter based on pulse width modulation and provided with a bridge circuit constituted by a plurality of switching elements (e.g., IGBTs) that are bridge connected, and has a function of performing conversion between DC power and AC power. The power converter 43 has a DC I/O side connected to the first power lines 21p, 21n, an AC I/O side connected to each coil of the U phase, V phase and W phase of the drive motor M. The power converter 43 converts the DC power of the first power lines 21p, 21n into three-phase AC power and supplies it to the drive motor M, and converts the three-phase AC power supplied from the drive motor M into DC power and supplies it to the first power lines 21p, 21n, by ON/OFF driving the switching elements of the respective phases in accordance with a gate drive signal generated at a predetermined timing by a gate drive circuit (not shown) of the motor ECU 72.

The voltage converter 5 connects the first power circuit 2 to second power circuit 3, and converts the voltage between the circuits 2, 3. The voltage converter 5 includes a known boost circuit.

Figure 2:
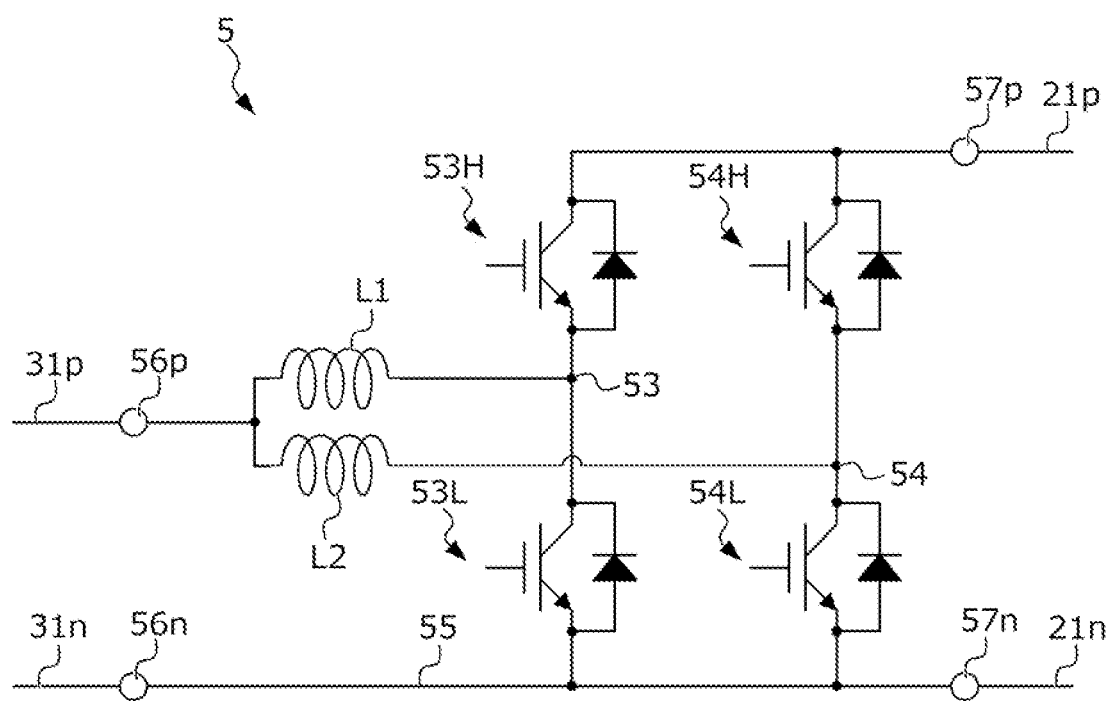
FIG. 2 is a diagram showing an example of the circuit configuration of a voltage converter.

FIG. 2 is a diagram showing an example of the circuit configuration of the voltage converter 5. The voltage converter 5 connects the first power lines 21p, 21n to which the first battery B1 is connected, to the second power lines 31p, 31*n* to which the second battery B2 is connected, and converts the voltage between the first power lines 21*p*, 21*n* and the second power lines 31*p*, 31*n*. The voltage converter 5 is a full-bridge DC-DC converter configured by combining a first reactor L1, a second reactor L2, a first high-arm element 53H, a first low-arm element 53L, a second high-arm element 54H, a second low-arm element 54L, a negative bus 55, low-voltage side terminals 56*p*, 56*n*, high-voltage side terminals 57*p*, 57*n*, and a smoothing capacitor (not shown).

The low-voltage side terminals 56*p*, 56*n* are connected to the second power lines 31*p*, 31*n*, and the high-voltage side terminals 57*p*, 57*n* are connected to the first power lines 21*p*, 21*n*. The negative bus 55 is wiring connecting the low-voltage side terminal 56*n* to the high-voltage side terminal 57*n*.

The first reactor L1 has one end connected to the low-voltage side terminal 56*p*, and the other end connected to a connection node 53 between the first high-arm element 53H and the first low-arm element 53L. The first high-arm element 53H and the first low-arm element 53L each include a known power switching element such as an IGBT or a MOSFET, and a freewheeling diode connected to the power switching element. The high-arm element 53H and the low-arm element 53L are connected in this order in series between the high-voltage side terminal 57*p* and the negative bus 55.

A collector of the power switching element of the first high-arm element 53H is connected to the high-voltage side terminal 57*p*, and the emitter thereof is connected to a collector of the first low-arm element 53L. An emitter of the power switching element of the first low-arm element 53L, is connected to the negative bus 55. The forward direction of the freewheeling diode provided to the first high-arm element 53H is a direction from the first reactor L1 towards the high-voltage side terminal 57*p*. The forward direction of the freewheeling diode provided to the first low-arm element 53L is a direction from the negative bus 55 towards the first reactor L1.

The second reactor L2 has one end connected to the low-voltage side terminal 56*p*, and the other end connected to a connection node 54 between the second high-arm element 54H and second low-arm element 54L. The second high-arm element 54H and the second low-arm element 54L each include a known power switching element such as an IGBT or a MOSFET, and a freewheeling diode connected to the power switching element. The high-arm element 54H and the low-arm element 54L are connected in this order in series between the high-voltage side terminal 57*p* and the negative bus 55. A collector of the power switching element of the second high-arm element 54H is connected to the high-voltage side terminal 57*p*, and the emitter thereof is connected to the collector of the second low-arm element 54L. An emitter of the power switching element of the second low-arm element 54L, is connected to the negative bus 55. The forward direction of the freewheeling diode provided to the second high-arm element 54H is a direction from the second reactor L2 towards the high-voltage side terminal 57*p*. The forward direction of the freewheeling diode provided to the second low-arm element 54L is a direction from the negative bus 55 towards the second reactor L2.

The voltage converter 5 converts the voltage between the first power lines 21*p*, 21*n* and the second power lines 31*p*, 31*n*, by alternately driving ON/OFF the first high-arm element 53H and second low-arm element 54L, and the first low-arm element 53L and second high-arm element 54H, in accordance with the gate drive signal generated at a predetermined timing by a gate drive circuit (not shown) of the converter ECU 73.

The static voltage of the second battery B2 is basically maintained lower than the static voltage of the first battery B1. Therefore, the voltage of the first power lines 21*p*, 21*n* is basically higher than the voltage of the second power lines 31*p*, 31*n*. Therefore, in a case of driving the drive motor M using both the power outputted from the first battery B1 and the power outputted from the second battery B2, the converter ECU 73 operates the voltage converter 5 to cause the voltage converter 5 perform a boost function. The boost function refers to a function of stepping up the power of the second power lines 31*p*, 31*n* to which the low-voltage side terminals 56*p*, 56*n* are connected, and outputting the power to the first power lines 21*p*, 21*n* to which the high-voltage side terminals 57*p*, 57*n* are connected, whereby a positive passing current flows from the second power lines 31*p*, 31*n* side to the first power lines 21*p*, 21*n* side. In a case where discharge of the second battery B2 is to be reduced and the drive motor M is to be driven by only the power outputted from the first battery B1, the converter ECU 73 turns off the voltage converter 5 and prevents the current from flowing from the first power lines 21*p*, 21*n* to the second power lines 31*p*, 31*n*.

In a case where the first battery B1 and/or the second battery B2 is to be charged with the regenerative electric power outputted from the drive motor M to the first power lines 21*p*, 21*n* during deceleration, the converter ECU 73 operates the voltage converter 5 to cause the voltage converter 5 to perform a step-down function. The step-down function refers to a function of stepping down the electric power in the first power lines 21*p*, 21*n* to which the high-voltage side terminals 57*p*, 57*n* are connected, and outputting the power to the second power lines 31*p*, 31*n* to which the low-voltage side terminals 56*p*, 56*n* are connected, whereby a negative passing current flows from the first power lines 21*p*, 21*n* side to the second power lines 31*p*, 31*n* side.

As described above, in the power supply system 1, the management ECU 71, the motor ECU 72, and the converter ECU 73 operate the voltage converter 5 and the power converter 43 to control the passing power in the voltage converter 5 and the passing power in the power converter 43, thereby enabling control of the charging/discharging of the first battery B1 and control of the charging/discharging of the second battery B2. Accordingly, in the present embodiment, the management ECU 71, the motor ECU 72, and the converter ECU 73 constitute a power controller for controlling the charging/discharging of the first battery B1 and the second battery B2.

Referring back to FIG. 1, the first battery ECU 74 is a computer mainly responsible for monitoring of the state of the first battery B1 and for the open/close operation of the contactors 22*p*, 22*n* of the first power circuit 2. The first battery ECU 74, calculates, based on a known algorithm using the detection value transmitted from the first battery sensor unit 81, various parameters representing the internal state of the first battery B1, namely, a temperature of the first battery B1, internal resistance of the first battery B1, a static voltage of the first battery B1, a closed circuit voltage of the first battery B1, a first output upper limit corresponding to the upper limit of the power that can be outputted from the first battery B1, and a first SOC corresponding to the charge rate of the first battery B1, etc. The information regarding the parameters representing the internal state of the first battery B1 acquired by the first battery ECU 74 is transmitted to the management ECU 71, for example.

The second battery ECU 75 is a computer mainly responsible for monitoring the state of the second battery B2 and for open/close operation of the contactors 32p, 32n of the second power circuit 3. The second battery ECU 75 calculates, based on a known algorithm using the detection value sent from the second battery sensor unit 82, various parameters representing the internal state of the second battery B2, namely, a temperature of the second battery B2, internal resistance of the second battery B2, a static voltage of the second battery B2, a closed circuit voltage of the second battery B2, a second output upper limit corresponding to the upper limit of the power that can be outputted from the second battery B2, and a second SOC corresponding to the charge rate of the second battery B2, etc. The information regarding the parameters representing the internal state of the second battery B2 acquired by the second battery ECU 75 is transmitted to the management ECU 71, for example.

The management ECU 71 is a computer that mainly manages the flow of electric power in the overall power supply system 1. The management ECU 71 generates a torque command signal corresponding to a command related to torque generated by the drive motor M, and a converter passing power command signal corresponding to a command related to converter passing power, which is passing through the voltage converter 5, by executing the power management processing to be described later with reference to FIG. 4.

The motor ECU 72 is a computer that mainly operates the power converter 43, and controls the flow of power between the first power circuit 2 and the drive motor M, that is, the flow of the inverter passing power, which passing through the power converter 43. In the following, the inverter passing power is defined as a positive when the power flows from the first power circuit 2 to the drive motor M, that is, when the drive motor M is in power driving. Further, the inverter passing power is defined as a negative when the power flows from the drive motor M to the first power circuit 2, that is, when the drive motor M is in regenerative driving. The motor ECU 72 operates the power converter 43 based on the torque command signal calculated based on the command for the inverter passing power by the management ECU 71 such that the drive motor M generates the torque corresponding to this command.

The converter ECU 73 is a computer that mainly operates the voltage converter 5, and controls the flow of power between the first power circuit 2 and the second power circuit 3, that is, the flow of the converter passing power which is passing through the voltage converter 5. In the following, the converter passing power is defined as a positive when the power flows from the second power circuit 3 to the first power circuit 2, that is, when the second battery B2 discharges and supplies power to the first power circuit 2. The converter passing power is defined as a negative when the power flows from the first power circuit 2 to the second power circuit 3, that is, when the second battery B2 is charged with power from the first power circuit 2. In response to the converter passing power command signal transmitted from the management ECU 71, the converter ECU 73 operates the voltage converter 5 so that the converter passing power according to the command passes through the voltage converter 5. More specifically, the converter ECU 73 calculates, based on the converter passing power command signal, a target current that is a target for the passing current in the voltage converter 5, and operates the voltage converter 5 according to a known feedback control algorithm so that a passing current (hereinafter also referred to as an "actual passing current") detected by the current sensor 33 becomes equal to the target current.

Figure 3:
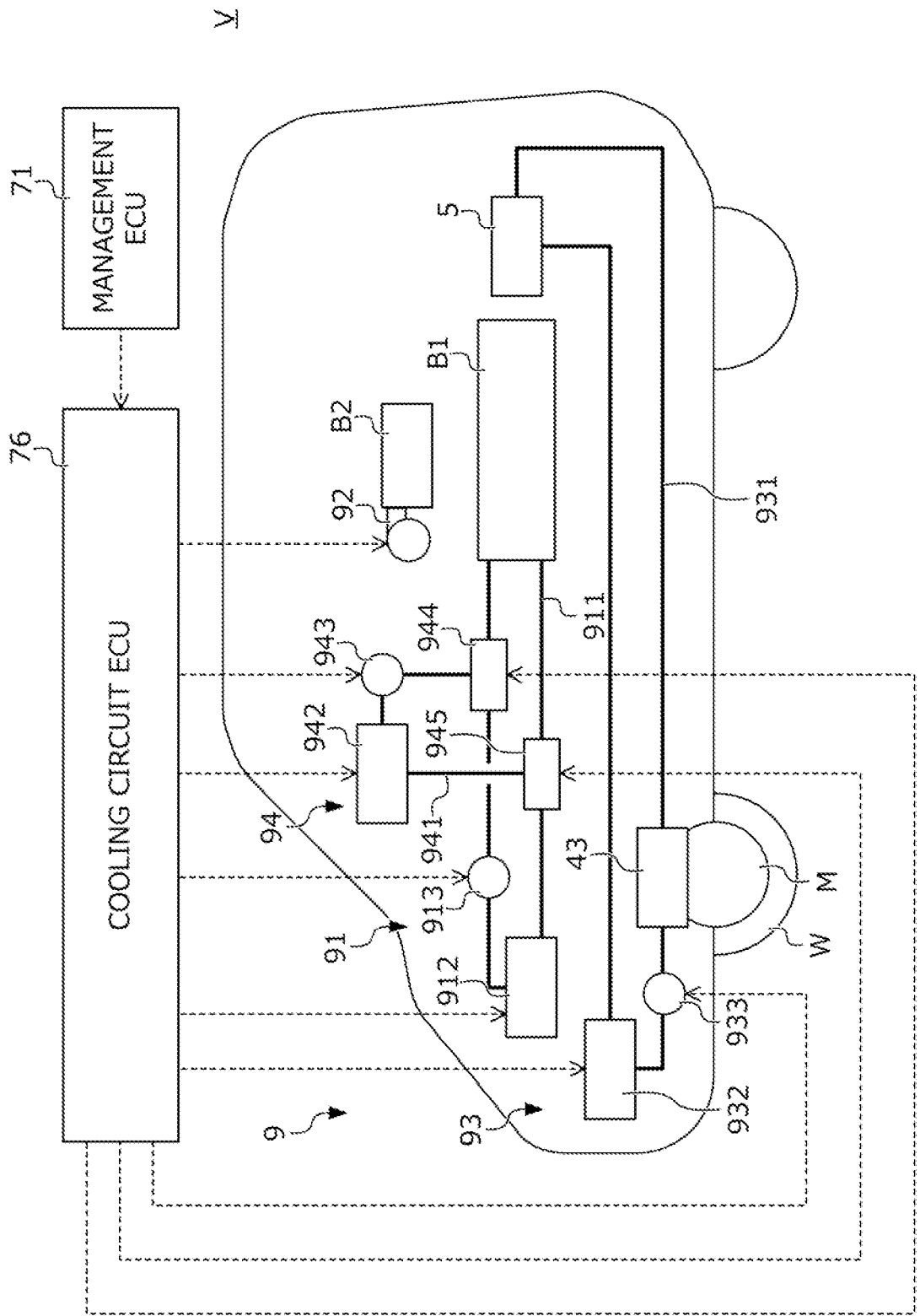
FIG. 3 is a diagram showing an example of a circuit configuration of a cooling circuit.

FIG. 3 is a diagram showing a circuit configuration of the cooling circuit 9. The cooling circuit 9 includes a first cooler 91 for cooling the first battery B1, a second cooler 92 for cooling the second batter B2, and a third cooler 93 for cooling the voltage converter 5 and the power converter 43.

The first cooler 91 includes a first cooling water circulating path 911 including a cooling water flow path formed in a battery case that houses the first battery B1, a first heat exchanger 912 and a first cooling water pump 913 provided on the first cooling water circulating path 911, and a heating device 94 connected to the first cooling water circulating path 911.

The first cooling water pump 913 rotates in response to a command inputted from the cooling circuit ECU 76, and circulates cooling water in the first cooling water circulating path 911. The first heat exchanger 912 promotes heat exchange between the cooling water circulating in the first cooling water circulating path 911 and outside air, thereby cooling the cooling water heated by the heat exchange with the first battery B1. The first heat exchanger 912 includes a radiator fan that rotates in response to a command inputted from the cooling circuit ECU 76.

The heating device 94 includes a bypass path 941 that connects an inlet and an outlet of the first heat exchanger 912 of the first cooling water circulating path 911 and bypasses the first heat exchanger 912, a heater 942 and a heating pump 943 provided on the bypass path 941, and three-way valves 944 and 945 at a connection portion between both ends of the bypass path 941 and the first cooling water circulating path 911.

The heating pump 943 rotates in response to a command inputted from the cooling circuit ECU 76, and circulates cooling water in the first cooling water circulating path 911 and the bypass path 941. The heater 942 generates heat by consuming electric power supplied from a battery (not shown), and raises the temperature of the cooling water flowing through the bypass path 941.

The three-way valves 944 and 945 open and close in response to a command from the cooling circuit ECU 76 to switch the flow path of the cooling water between the first heat exchanger 912 side and the heater 942 side. Therefore, the first cooler 91 has two functions: a cooling function of cooling the first battery B1 by circulation of the cooling water cooled by the first heat exchanger 912; and a heating function of heating the first battery B1 by circulation of the cooling water heated by the heater 942. The cooling circuit ECU 76 controls a first cooling output corresponding to cooling performance provided on the first battery B1 by the first cooler 91, by operating the first heat exchanger 912, the first cooling water pump 913, the heater 942, the heating pump 943, and three-way valves 944 and 945 based on the detection value of a cooling water temperature sensor (not shown) and a command from the management ECU 71. Accordingly, in the present embodiment, the management ECU 71 and the cooling circuit ECU 76 constitute a first cooling output controller for controlling a first cooling output of the first cooler 91.

The second cooler 92 includes, for example, a cooling fan that supplies outside air into a battery case that houses the second battery B2. The second cooler 92 rotates in response to ae command from the cooling circuit ECU 76, and supplies the outside air into the battery case of the second battery B2 to cool the second battery B2.

The third cooler 93 includes a third cooling water circulating path 931 including a cooling water flow path formed in a housing in which the voltage converter 5 and the power converter 43 are installed, and a third heat exchanger 932 and a third cooling water pump 933 provided in the third cooling water circulating path 931.

The third cooling water pump 933 rotates in response to a command inputted from the cooling circuit ECU 76, and circulates cooling water in the third cooling water circulating path 931. The third heat exchanger 932 promotes heat exchange between the cooling water circulating in the third cooling water circulating path 931 and outside air, thereby cooling the cooling water heated by the heat exchange with the voltage converter 5 and the power converter 43. The third heat exchanger 932 includes a radiator fan that rotates in response to a command inputted from the cooling circuit ECU 76.

The cooling circuit ECU 76 operates the third heat exchanger 932 and the third heat cooling water pump 933 based on the detection value of a cooling water temperature sensor (not shown) and a command from the management ECU 71, and thereby controls the third cooling output corresponding to cooling performance provided on the voltage converter 5 and the power converter 43 by the third cooler 93.

In the present embodiment, as described above, the first cooler 91 for cooling the first battery B1 and the third cooler 93 for cooling the voltage converter 5, etc. are of a water cooling type in which the cooling is performed by heat exchange with the cooling water, and the second cooler 92 for cooling the second battery B2 having a smaller heat capacity than the first battery B1 is of an air cooling type in which the cooling is performed by heat exchange with the outside air; however, the present invention is not limited thereto. The first cooler 91 may be configured as the air cooling type, the second cooler 92 may be configured as the water cooling type, and the third cooler 93 may be configured as the air cooling type. In the present embodiment, the circulation flow path of the cooling water for cooling the first battery B1 and the circulation flow path of the cooling water for cooling the voltage converter 5 and the power converter 43 are configured as separate systems, but the present invention is not limited thereto. Both or either of the voltage converter 5 and the power converter 43 may be cooled by the cooling water for cooling the first battery B1.

Figure 4:
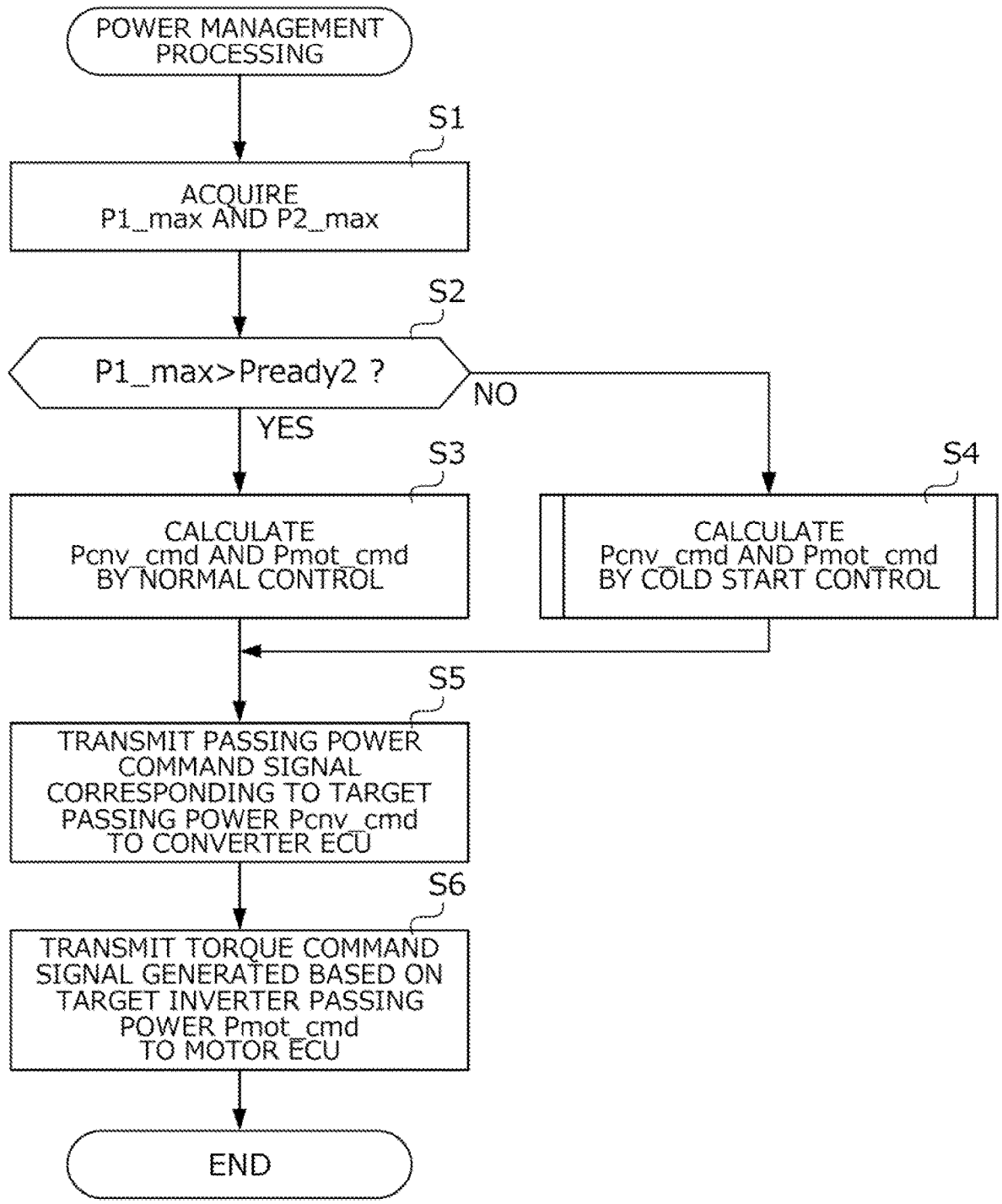
FIG. 4 is a flowchart showing a specific procedure of power management processing.

FIG. 4 is a flowchart showing a specific procedure of the power management processing. The power management processing is repeatedly executed in predetermined cycles in the management ECU 71 from the time when the driver turns on a start switch (not shown) to start operating the vehicle V and the power supply system 1 to the time when the driver then turns off the start switch to stop the operation of the vehicle V and the power supply system 1.

First, in Step S1, the management ECU 71 acquires, as parameters indicating current power output performance of the current first battery B1 and current power output performance of the second battery B2, a first output upper limit P1_max that is an upper limit of the power that can be outputted from the first battery B1 and a second output upper limit P2_max that is an upper limit of the power that can be outputted from the second battery B2, from the first battery ECU 74 and the second battery ECU 75, respectively, and then, the management ECU 71 proceeds to Step S2.

Next, in Step S2, the management ECU 71 determines whether the first output upper limit P1_max acquired in Step S1 is larger than a margin traveling threshold value Pready2 defined as a second condition threshold value (P1_max>Pready2). The margin traveling threshold value Pready2 corresponds to, for example, electric power that enables margin traveling, more specifically, electric power that enables high-speed traveling (not full power traveling) using a drive force generated by the drive motor M.

When the determination result in Step S2 is YES, that is, when the first battery B1 is heated to the extent that the margin traveling is possible only with the power outputted from the first battery B1 and the power output performance of the first battery B1 is ensured, the management ECU 71 proceeds to Step S3.

In Step S3, the management ECU 71 executes a normal control, under which the first battery B1 is discharged in preference to the second battery B2, and thereby calculates a target converter passing power Pcnv_cmd corresponding to a target for the converter passing power in the voltage converter 5 and a target inverter passing power Pmot_cmd corresponding to a target for the inverter passing power in the power converter 43, and then, proceeds to Step S5.

In the normal control, basically, the management ECU 71 calculates the target converter passing power Pcnv_cmd and the target inverter passing power Pmot_cmd such that a request for the inverter passing power in the power converter 43, that is, all of the requested inverter passing power Pmot_d (see S15 in FIG. 5 to be described later) corresponding to the requested output in the drive motor M can be covered by the power outputted from the first battery B1. Further, when the requested inverter passing power Pmot_d exceeds the first output upper limit P1_max of the first battery B1, the management ECU 71 calculates the target converter passing power Pcnv_cmd and the target inverter passing power Pmot_cmd such that the second battery B2 outputs power corresponding to a shortage obtained by subtracting the first output upper limit P1_max from the requested inverter passing power Pmot_d. Further, in the normal control, the management ECU 71 appropriately acquires a second SOC of the second battery B2 from the second battery ECU 75, and charges the second battery B2 with the power outputted appropriately from the first battery B1 such that the second SOC is maintained within a predetermined second SOC target range. In other words, when the second SOC falls below a lower limit value of the second SOC target range, the management ECU 71 sets the target converter passing power Pcnv_cmd as a negative value, and thus charges the second battery B2 with the power outputted from the first battery B1.

Further, when the determination result in Step S2 is NO, that is, when the first battery B1 is not heated to the extent that the margin traveling is possible only with the power outputted from the first battery B1, the management ECU 71 proceeds to Step S4. In Step S4, the management ECU 71 executes a cold start control described later with reference to FIG. 5 to calculate the target converter passing power Pcnv_cmd and the target inverter passing power Pmot_cmd, and then, proceeds to Step S5.

Next, in Step S5, the management ECU 71 generates a converter passing power command signal according to the target converter passing power Pcnv_cmd and transmits the generated signal to the converter ECU 73, and then, proceeds to Step S6. Thus, the power according to the target converter passing power Pcnv_cmd is charged and discharged from the second battery B2.

Next, in Step S6, the management ECU 71 generates a torque command signal based on the target inverter passing power Pmot_cmd and transmits the generated signal to the motor ECU 72, and ends the power management processing. More specifically, the management ECU 71 calculates target drive torque by converting the target inverter passing power Pmot_cmd into torque, and generates a torque command signal according to the target drive torque. The motor ECU 72 operates the power converter 43 based on this torque command signal. As a result, the power according to the target inverter passing power Pmot_cmd flows between the first power circuit 2 and the drive motor M.

Figure 5:
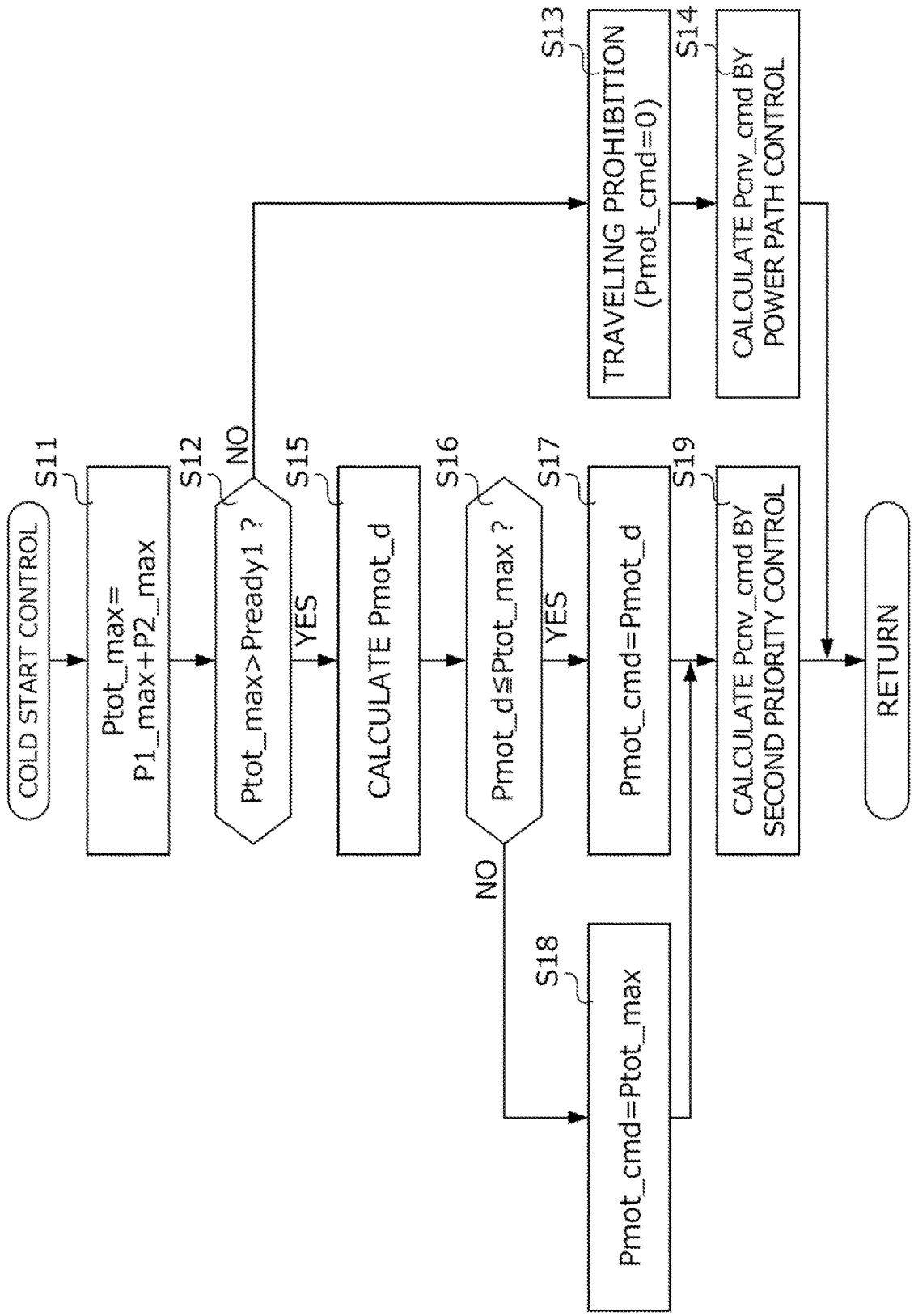
FIG. 5 is a flowchart showing a specific procedure of a cold start control.

FIG. 5 is a flowchart showing a specific procedure of the cold start control. First, in Step S11, the management ECU 71 adds up the first output upper limit P1_max and the second output upper limit P2_max acquired in Step S1, thereby calculating, as a parameter indicating power output performance of all of the batteries including the first battery B1 and the second battery B2, a total output upper limit Ptot_max corresponding an upper limit of power that can be outputted from all of the batteries, and then, proceeds to Step S12.

Next, in Step S12, the management ECU 71 determines whether the total output upper limit Ptot_max calculated in Step S11 is larger than a travelable threshold value Pready1 defined as a first condition threshold value (Ptot_max>Pready1). The travelable threshold value Pready1 is set to a value smaller than the margin traveling threshold value Pready2 describe above. More specifically, the travelable threshold value Pready1 corresponds to a lower limit of electric power that enables urban-district traveling using the drive force generated by the drive motor M, for example.

When the determination result in Step S12 is NO, that is, when the power output performance of the first battery B1 and the second battery B2 is not ensured to the extent that the urban-district traveling is possible with the power outputted from all of the batteries, the management ECU 71 proceeds to Step S13.

In Step S13, the management ECU 71 sets the target inverter passing power Pmot_cmd to 0 in order to prohibit the vehicle V from traveling, and then, proceeds to Step S14.

Next, in Step S14, the management ECU 71 calculates the target converter passing power Pcnv_cmd by executing a power pass control under which the power is transferred between the first battery B1 and the second battery B2, and then, proceeds to Step S5 in FIG. 4. Under the power pass control, first, the management ECU 71 acquires the first and second SOCs from the battery ECUs 74 and 75, and determines a discharge battery and a charge battery based on the first and second SOCs. Basically, the management ECU 71 sets one of the batteries B1 and B2 that has the larger SOC as a discharge battery, and sets the other that has the smaller SOC as a charge battery. Further, the management ECU 71 calculates the target converter passing power Pcnv_cmd within a range of the output upper limit of the discharge battery so that the power passes from the discharge battery to the charge battery through the voltage converter 5. For example, when the first battery B1 is set as the discharge battery and the second battery B2 is set as the charge battery, the management ECU 71 calculates the target converter passing power Pcnv_cmd within a range from 0 to −P1_max. When the second battery B2 is set as the discharge battery and the first battery B1 is set as the charge battery, the management ECU 71 calculates the target converter passing power Pcnv_cmd within a range from 0 to P2_max. Thus, under the power pass control, the power is supplied from the discharge battery to the charge battery through the voltage converter 5, and the discharge battery and the charge battery rise in temperature. In addition, when the SOC of the discharge battery falls below a predetermined lower limit or the SOC of the charge battery exceeds a predetermined upper limit, the management ECU 71 sets the battery, which has been set as the discharge battery, as the charge battery and sets the other battery, which has been set as the charge battery, as the discharge battery, and thereby executes the power pass control until the condition of Step S12 (Ptot_max>Pready1) is satisfied, whereby the first battery B1 and the second battery B2 rise in temperature.

When the determination result in Step S12 is YES, that is, when the power output performance of the first battery B1 and the second battery B2 is ensured to the extent that the urban-district traveling is possible with the power outputted from all of the batteries, the management ECU 71 proceeds to Step S15.

In Step S15, the management ECU 71 calculates a requested drive torque by the driver based on the operation amount of the pedals such as the accelerator pedal and brake pedal (see FIG. 1) by the driver, and converts the requested drive torque into power, thereby calculating a requested inverter passing power Pmot_d corresponding to the request for the requested output in the drive motor M, and then, proceeds to Step S16.

Next, in Step S16, the management ECU 71 determines whether the requested inverter passing power Pmot_d calculated in Step S15 is equal to or less than the total output upper limit Ptot_max calculated in Step S11.

When the determination result in Step S16 is YES, the management ECU 71 proceeds to Step S17, sets the requested inverter passing power Pmot_d as the target inverter passing power Pmot_cmd (Pmot_cmd=Pmot_d), and then, proceeds to Step S19. When the determination result in Step S16 is NO, the management ECU 71 proceeds to Step S18, sets the total output upper limit Ptot_max as the target inverter passing power Pmot_cmd (Pmot_cmd=Ptot_max), and then, proceeds to Step 319. As described above, after the condition of Step S12 is satisfied, the management ECU 71 sets the target inverter passing power Pmot_cmd within a range from 0 to total output upper limit Ptot_max in order to permit traveling.

In Step S19, the management ECU 71 executes a second priority control under which the second battery B2 is charged and discharged in preference to the first battery B1, and thereby calculates the target converter passing power Pcnv_cmd, and then, proceeds to Step S5 in FIG. 4.

Under the second priority control, basically, the management ECU 71 calculates the target converter passing power Pcnv_cmd such that all of the target inverter passing power Pmot_cmd described above are covered by the power outputted from the second battery B2. Further, when the target inverter passing power Pmot_cmd exceeds the second output upper limit P2_max of the second battery B2, the management ECU 71 calculates the target converter passing power Pcnv_cmd such that the first battery B1 outputs power corresponding to the shortage obtained by subtracting the second output upper limit P2_max from the target inverter passing power Pmot_cmd. In this way, the management ECU 71 actively charges and discharges the second battery B2 until the condition of Step S2 in FIG. 4 is satisfied after the condition of Step S12 is satisfied, and thus executes the second priority control under which the second battery B2 predominantly rises in temperature.

Figure 6:
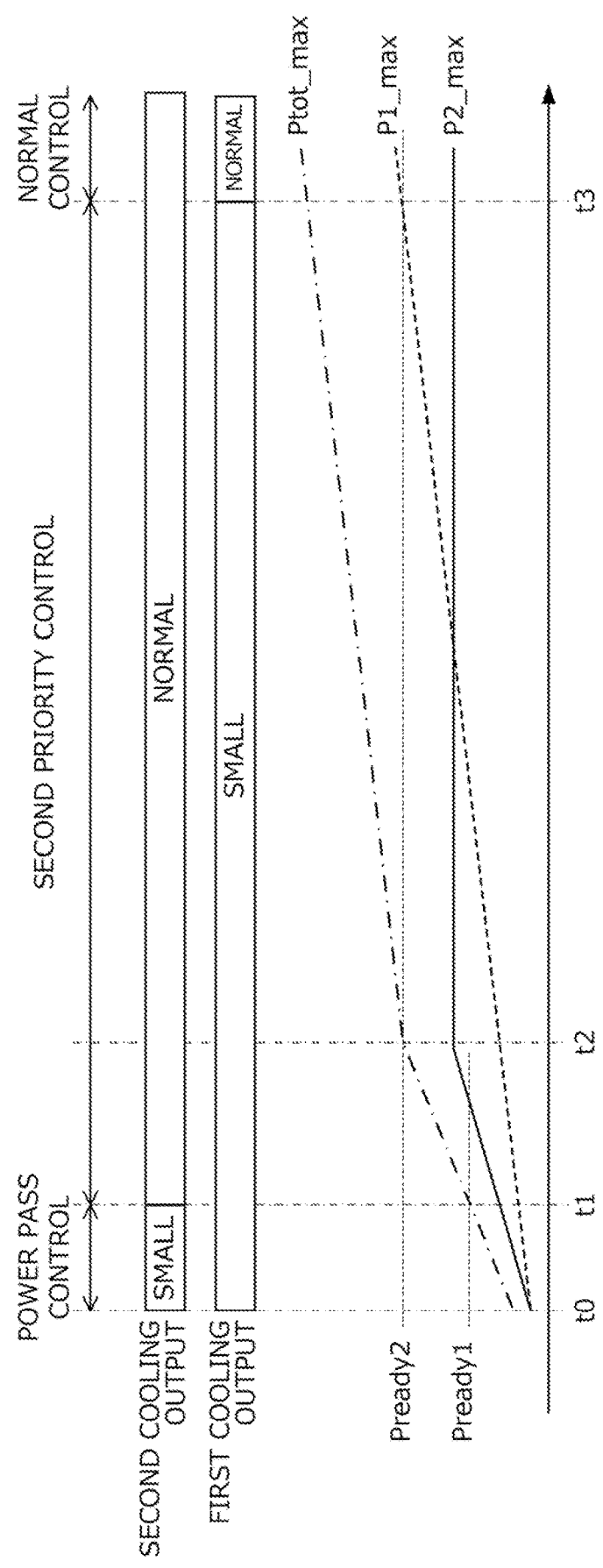
FIG. 6 is a time chart showing changes in time of a first output upper limit, a second output upper limit, and a total output upper limit when the cold start control is executed at the time of start of operation.

FIG. 6 is a time chart showing changes in time of the first output upper limit P1_max, the second output upper limit P2_max, the total output upper limit Ptot_max, the first cooling output, and the second cooling output in a case where the cold start control described above is executed at the time of start of the vehicle V and the power supply system 1.

First, a driver starts operating the vehicle V and the power supply system 1 at a time t0. FIG. 6 shows the following case: since the first battery B1 and the second battery B2 are cold due to having been exposed to a low temperature environment for a long time, the first output upper limit P1_max is less than the margin traveling threshold value Pready2 and the total output upper limit Ptot_max is also less than the travelable threshold value Pready1 at the time t0 (see Step S2 in FIG. 4 and Step S12 in FIG. 5). For this reason, until the condition of Step S12 in FIG. 5 is satisfied after the start of the operation at the time t0, the management ECU 71 prohibits the vehicle V from traveling (see Step S13 in FIG. 5), and executes the power pass control under which the power is transferred between the first battery B1 and the second battery B2 (see Step S14 in FIG. 5). As a result, subsequent to the time t0, the first battery B1 and the second battery B2 gradually rise in temperature, and the first output upper limit P1_max and the second output upper limit P2_max are increased. At this time, since the second battery B2 has a smaller heat capacity than the first battery B1, the temperature of the second battery B2 rises more rapidly than the temperature of the first battery B1, and the second output upper limit P2_max also increases more rapidly than the first output upper limit P1_max.

Thereafter, at a time t1, the total output upper limit Ptot_max exceeds the travelable threshold value Pready1. In other words, at the time t1, the condition of Step S12 in FIG. 5 is satisfied. For this reason, the management ECU 71 brings the vehicle V into a state of being capable of traveling (see Steps S15 to S18 FIG. 5), and executes the second priority control, under which the second battery B2 is charged and discharged in preference to the first battery B1, until the condition of Step S2 in FIG. 4 is satisfied (see Step S19 in FIG. 5). Thus, subsequent to the time t1, the temperature of the second battery B2 is raised further actively, and thus the second output upper limit P2_max is further increased.

Thereafter, at a time t2, the total output upper limit Ptot_max exceeds the margin traveling threshold value Pready2. For this reason, although the condition of Step S2 in FIG. 4 is not satisfied at the time t2, the vehicle V can perform the margin traveling, using the output of all the batteries including the first battery B1 and the second battery B2.

Thereafter, at a time t3, the first output upper limit P1_max exceeds the margin traveling threshold value Pready2. In other words, at the time t3, the condition of Step S2 in FIG. 4 is satisfied. For this reason, the management ECU 71 executes the normal control under which the first battery B1 is discharged in preference to the second battery B2 (see Step S3 in FIG. 4).

As described above, in order to quickly enable the vehicle V to travel at the time of the cold start in the power supply system 1 and to quickly enable the vehicle V to travel with a margin, it is necessary to raise the temperature of the second battery 32 quickly under the power pass control between the times t0 and t1 and the second priority control after the time t1. Therefore, subsequent to the start of operation at the time t0, the cooling circuit ECU 76 preferably maintains the second cooling output of the second cooler 92 at a small value until the condition of Step S12 in FIG. 5 is satisfied at the time t1, and brings the second cooling output into a normal state subsequent to the time t1. In other words, subsequent to the start of operation at the time t0, the cooling circuit ECU 76 preferably makes the second cooling output smaller until the condition of Step S12 in FIG. 5 is satisfied at the time t1 as compared with that after the time t1. In order to raise the first output upper limit P1_max to the margin traveling threshold value Pready2 as quickly as possible, preferably, the cooling circuit ECU 76 makes the first cooling output smaller by the first cooler 91 until the condition of Step S2 in FIG. 4 is satisfied at the time t2 subsequent to the start of operation at the time t6, and brings the first cooling output into a normal state subsequent to the time t2. In other words, subsequent to the start of operation at the time t0, the cooling circuit ECU 76 preferably makes the first cooling output of the first cooler 91 smaller until the condition of Step S2 in FIG. 4 is satisfied at the time t2, as compared with that after the time t2.

The power supply system 1 according to the present embodiment exerts the following effects.

(1) After starting operating the vehicle V, the management ECU 71 executes the power pass control, under which the power is transferred between the first battery B1 and the second battery B2, until the first condition (Step S12 in FIG. 5) regarding the total output upper limit Ptot_max of all the batteries including the first battery B1 and the second battery B2 is satisfied, and raises the temperatures of these batteries B1 and B2. Thereafter, the management ECU 71 executes the second priority control, under which the second battery B2 is discharged in preference to the first battery B1, until the second condition (Step S2 in FIG. 4) regarding the first output upper limit P1_max of the first battery B1 is satisfied. In the power supply system 1, the second battery B2 having a smaller heat capacity than the first battery B1 is used. Therefore, according to the power supply system 1, since the temperature of the second battery B2 can be raised more quickly than that of the first battery B1 by execution of the power pass control and the second priority control at the time of cold start, the required power output performance can be quickly ensured mainly by the second battery B2.

(2) In the power supply system 1, an output-type battery having a higher output-weight density and a lower energy-weight density than the first battery B1 is used as the second battery B2, whereby the second battery B2 can be heated more quickly at the time of execution of the power pass control and the second priority control, so that the required power output performance can be further quickly ensured mainly by the second battery B2.

(3) In the power supply system 1, an output-type battery having a higher output-weight density and a lower energy-weight density than the first battery B1 is used as the second battery B2. Therefore, according to the power supply system 1, since the output-type second battery B2 can be heated more quickly than the capacitive first battery B1 by execution of the power pass control and the second priority control at the time of cold start, the required power output performance can be quickly ensured mainly by the second battery B2.

(4) In the second priority control, the management ECU 71 operates the voltage converter 5 and the power converter 43 such that the first battery B1 outputs power corresponding to the shortage obtained by subtracting the second output upper limit P2_max from the requested inverter passing power Pmot_d corresponding to the requested output in the drive motor M. Due to this feature, after the first condition is satisfied, while a propulsive force for moving the vehicle V is generated by the power supplied from the first power circuit 2 to the drive motor M according to the request, the second battery B2 can be caused to actively discharge, so that the temperature of the second battery B2 can be raised quickly.

(5) The management ECU 71 executes the normal control, under which the second battery B2 having a smaller heat capacity than the first battery B1 is preferentially caused to discharge, after executing the second priority control until the first output upper limit P1_max of the first battery B1 exceeds the margin traveling threshold value Pready2. Due to this feature, after the second condition is satisfied, the temperature of the first battery B1 can be further raised, so that the power output performance of the first battery B1 can be further improved.

(6) The management ECU 71 charges the second battery B2 with the power outputted from the first battery B1 under the normal control after the second condition is satisfied. Due to this feature, it is possible to promote the temperature rise of the first battery B1 while ensuring a sufficient battery level of the second battery B2 whose power output performance has become sufficiently high through the power pass control and the second priority control, and to further improve the power output performance of the first battery B1.

(7) The cooling circuit ECU 76 makes the first cooling output of the first cooler 91 smaller until the second condition is satisfied, that is, while the temperature of the second battery B2 is mainly raised by the power pass control and the second priority control, as compared with after the second condition is satisfied. This feature makes it possible to shorten the time until the second condition is satisfied, that is, the time until the margin traveling is possible only with the first battery B1.

(8) The cooling circuit ECU 76 makes the second cooling output of the second cooler 92, which cools the second battery B2, smaller until the first condition is satisfied, that is, while the temperature of the second battery B2 is raised by the power pass control, as compared with after the first condition is satisfied, that is, while the temperature of the second battery B2 is raised by execution of the second priority control. This feature makes it possible to shorten the time until the first condition is satisfied, that is, the time until the propulsive force for moving the vehicle V can be generated.

Although an embodiment of the present invention has been described above, the present invention is not limited thereto. The configurations of detailed parts may be modified as appropriate within the scope of the gist of the present invention.

In the above-described embodiment, for example, the power pass control is shifted to the second priority control under the cold start control depending on the fact that the condition (Step S12 in FIG. 5) regarding the total output upper limit Ptot_max of all the batteries including the first battery B1 and the second battery B2 is satisfied, but the present invention is not limited thereto. For example, the normal control may be shifted to the second priority control depending on the fact that the condition regarding the first output upper limit P1_max of the first battery B1 or the second output upper limit P2_max of the second battery B2 is satisfied.

In the above-described embodiment, the second priority control is shifted to the normal control under the cold start control depending on the fact that the condition (Step S2 in FIG. 4) regarding the first output upper limit P1_max of the first battery B1 is satisfied, but the present invention is not limited thereto. For example, the second priority control may be shifted to the normal control depending on the fact that the condition regarding the second output upper limit P2_max of the second battery B2 or the total output upper limit Ptot_max of all the batteries including the first battery B1 and the second battery B2 is satisfied.

What is claimed is:

1. A power supply system comprising:
   a first power circuit including a first electrical storage device;
   a second power circuit including a second electrical storage device having a smaller heat capacity or a higher output-weight density and a lower energy-weight density than the first electrical storage device;
   a voltage converter that converts a voltage between the first power circuit and the second power circuit;
   a power converter that converts power between the first power and a rotary electrical machine;
   a power controller that controls charging and discharging of the first and second electrical storage devices by operating the voltage converter and the power converter;
   a first cooler that cools the first electrical storage device; and
   a first cooling output controller that controls a first cooling output of the first cooler,
   the power controller being configured to:
   after a start of operation, execute a power pass control under which power is transferred between the first electrical storage device and the second electrical storage device, until a first condition regarding power output performance of both or either of the first electrical storage device and the second electrical storage device is satisfied, and
   subsequent to the power pass control, execute a second priority control under which the second electrical storage device is discharged in preference to the first electrical storage device, until a second condition regarding power output performance of both or either of the first electrical storage device and the second electrical storage device is satisfied,
   wherein the first cooling output controller makes the first cooling output smaller until the second condition is satisfied, as compared with after the second condition is satisfied.

2. A power supply system comprising:
   a first power circuit including a first electrical storage device;
   a second power circuit including a second electrical storage device having a smaller heat capacity or a higher output-weight density and a lower energy-weight density than the first electrical storage device;
   a voltage converter that converts a voltage between the first power circuit and the second power circuit;
   a power converter that converts power between the first power circuit and a rotary electrical machine;
   a power controller that controls charging and discharging the first and second electrical storage devices by operating the voltage converter and the power converter;
   a second cooler that cools the second electrical storage device; and
   a second cooling output controller that controls a second cooling output f the second cooler,
   the power controller being configured to:
   after a start of operation, execute a power pass central under which power is transferred between the first electrical storage device and the second electrical storage device, until a first condition regarding power output performance of both or either of the first electrical storage device and the second electrical storage device is satisfied, and
   subsequent to the power pass control, execute a second priority control under which the second electrical storage device is discharged in preference to the first electrical storage device, until a second condition regarding power output performance of both or either of the first electrical storage device and the second electrical storage device is satisfied, wherein the second cooling output controller makes the second cooling output smaller until the first condition is satisfied, as compared with after the first condition is satisfied.

* * * * *